(12) United States Patent
Sato

(10) Patent No.: US 10,754,595 B2
(45) Date of Patent: Aug. 25, 2020

(54) IMAGE PROCESSING APPARATUS AND CONTROL METHOD FOR IMAGE PROCESSING APPARATUS

(71) Applicant: CANON KABUSHIKI KAISHA, Tokyo (JP)

(72) Inventor: Tomoya Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/248,585

(22) Filed: Jan. 15, 2019

(65) Prior Publication Data

US 2019/0235795 A1    Aug. 1, 2019

(30) Foreign Application Priority Data

Jan. 31, 2018 (JP) ................................ 2018-014285

(51) Int. Cl.
*G06F 3/12* (2006.01)

(52) U.S. Cl.
CPC ............ *G06F 3/121* (2013.01); *G06F 3/1203* (2013.01); *G06F 3/126* (2013.01); *G06F 3/1234* (2013.01); *G06F 3/1258* (2013.01); *G06F 3/1267* (2013.01); *G06F 3/1274* (2013.01); *G06F 3/1285* (2013.01)

(58) Field of Classification Search
CPC combination set(s) only.
See application file for complete search history.

(56) References Cited

U.S. PATENT DOCUMENTS

| | | | | |
|---|---|---|---|---|
| 2001/0029521 | A1* | 10/2001 | Matsuda | ............ H04N 1/00225 709/201 |
| 2008/0168450 | A1* | 7/2008 | Tarumi | ................... G06Q 10/00 718/102 |
| 2009/0310191 | A1* | 12/2009 | Takahama | .......... H04N 1/00572 358/474 |
| 2012/0050783 | A1 | 3/2012 | Osuki | |
| 2013/0308156 | A1* | 11/2013 | Kakutani | ........... G06K 15/4095 358/1.14 |
| 2014/0211240 | A1* | 7/2014 | Maki | ..................... G06F 3/1222 358/1.14 |
| 2016/0011835 | A1* | 1/2016 | Igarashi | ................ G06F 3/1292 358/1.15 |
| 2017/0052745 | A1 | 2/2017 | Kanematsu | |
| 2017/0134593 | A1* | 5/2017 | Kadoda | ............. H04N 1/00082 |
| 2017/0218660 | A1* | 8/2017 | Muchna | ............. E05B 47/0002 |
| 2017/0371600 | A1* | 12/2017 | Tanaka | ................. A61B 5/0022 |
| 2018/0113655 | A1* | 4/2018 | Sawata | ................. G06F 3/1205 |

FOREIGN PATENT DOCUMENTS

EP    2428886 A2    3/2012
JP    08-6745 A    1/1996

* cited by examiner

*Primary Examiner* — Helen Zong
(74) *Attorney, Agent, or Firm* — Canon U.S.A., Inc. IP Division

(57) ABSTRACT

An image processing apparatus acquires user identification information about a user who is currently logged in to the image processing apparatus and performs control such that a job stored in association with the user indicated by the user identification information acquired is suspended and a job stored in association with a user different from the user indicated by the user identification information acquired is not suspended.

12 Claims, 18 Drawing Sheets

FIG.7

PLEASE INPUT USER ID AND PASSWORD AND PRESS [LOGIN].

USER ID: ▭ ~701

PASSWORD: ▭ ~702

LOGIN ~703

FIG.14

| JOB ID 1401 | JOB EXECUTION USER ID 1402 | JOB NAME 1403 | RECEPTION DATE AND TIME 1404 | STATUS 1405 |
|---|---|---|---|---|
| 0000 | user_00 | MEETING MATERIAL.doc | 2017/5/30 9:25:00 | BEING SUSPENDED |
| 0001 | user_00 | SUBMITTED MATERIAL.xls | 2017/5/30 9:25:30 | BEING SUSPENDED |
| 0002 | user_01 | MEETING ADDITIONAL MATERIAL.doc | 2017/5/30 9:27:00 | BEING EXECUTED |
| 0003 | user_02 | ADDITIONAL MATERIAL.xls | 2017/5/30 9:27:10 | PRINT WAITING |
| 0004 | user_01 | ADDITIONAL MATERIAL.xls | 2017/5/30 9:28:30 | PRINT WAITING |
| | | | | |

IMAGE PROCESSING APPARATUS AND CONTROL METHOD FOR IMAGE PROCESSING APPARATUS

BACKGROUND

Field of the Disclosure

The present disclosure relates to a control for stopping a job which is input to an image processing apparatus, such as a printing apparatus, via a network.

Description of the Related Art

As a job processing apparatus with a plurality of processing functions, an image processing apparatus, such as a digital multifunction peripheral, is known. Such a digital multifunction peripheral includes processing functions, such as copying, printing, scanning, electronic mail (e-mail) transmission, and facsimile transmission and reception. In addition, the digital multifunction peripheral is also capable of executing processing functions to store digital data in a storage apparatus and call digital data from the storage apparatus.

In the image processing apparatus described above, a plurality of jobs can be input. However, when a job is input by mistake, it may be difficult to immediately select the job from a job list to cancel the job.

To solve the above-described issue, there is known an image processing apparatus configured such that all jobs are suspended in response to a print stop request from a user, and after a job to be cancelled is selected to perform a cancellation operation, the other jobs are resumed (Japanese Patent Application Laid-Open No. H08-6745). In such an image processing apparatus, all jobs are suspended first. Accordingly, the image processing apparatus is useful when the user urgently needs to stop a job.

In the image processing apparatus described above, however, if a job suspension request is made by the user, all jobs, including jobs input by users other than the user who has attempted to cancel the job, are suspended. This leads to an issue of a deterioration in the productivity of the entire image processing apparatus.

SUMMARY

According to some embodiments, an image processing apparatus including an image forming unit configured to print an image on a sheet includes an acquisition unit configured to acquire user identification information about a user who is currently logged in to the image processing apparatus, a storage unit configured to store a job and a user who has input the job in association with each other, a control unit configured to perform control such that a job using the image forming unit is not executed according to a suspension operation performed by the user, a display unit configured to display a job list screen for displaying jobs stored in the storage unit, and a cancellation unit configured to cancel a job selected on the job list screen. The control unit performs control such that a job stored in association with the user indicated by the user identification information acquired by the acquisition unit is suspended and a job stored in association with a user different from the user indicated by the user identification information acquired by the acquisition unit is not suspended.

Further features of various embodiments will become apparent from the following description of exemplary embodiments with reference to the attached drawings.

BRIEF DESCRIPTION OF THE DRAWINGS

FIG. 7 illustrates a login screen to be displayed on an output apparatus of a PC(2).

FIG. 14 is a table illustrating a print job queue in the image processing apparatus.

DESCRIPTION OF THE EMBODIMENTS

Image processing apparatuses according to exemplary embodiments will be described below with reference to the drawings.

Figure 1:
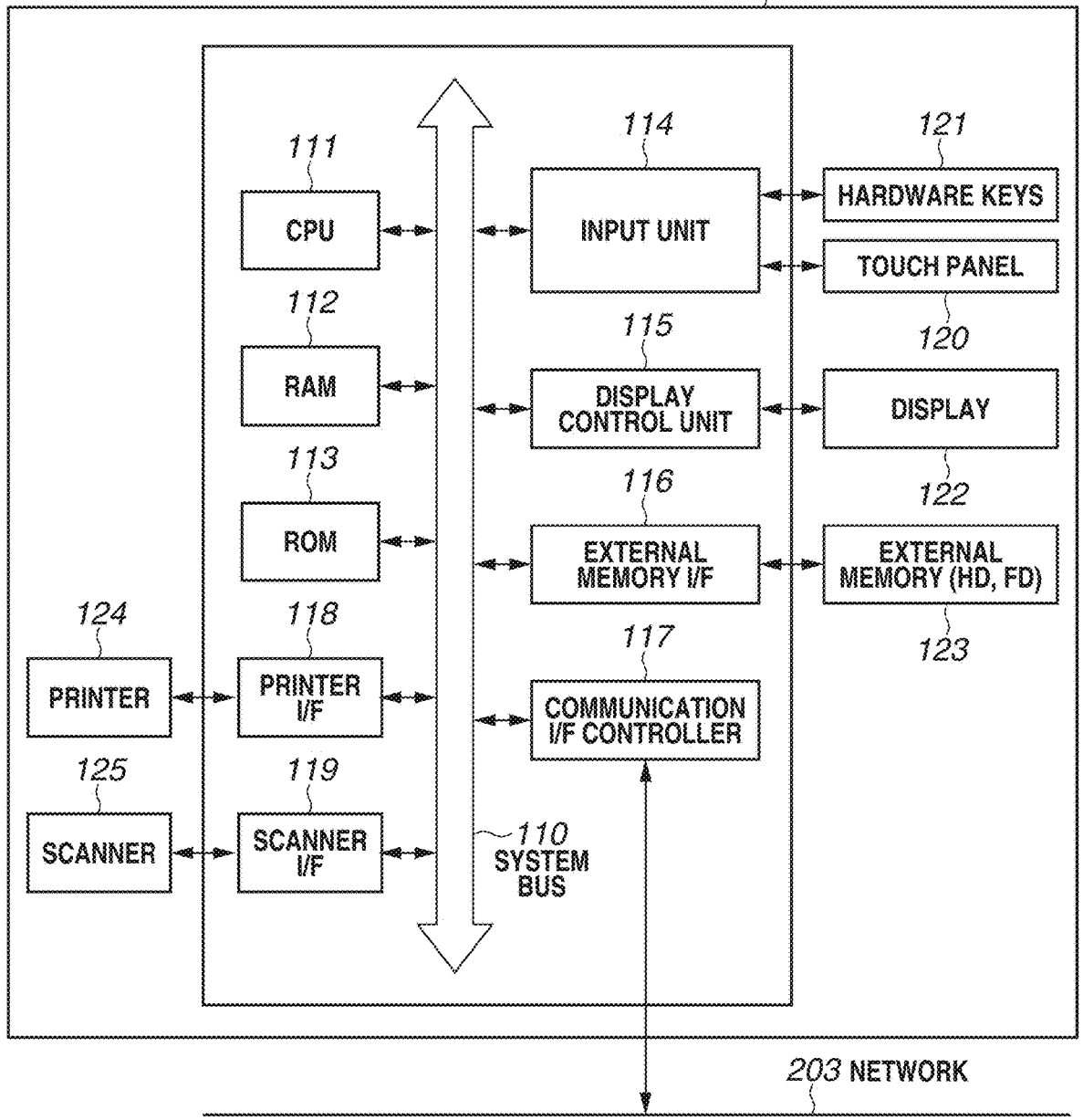
FIG. 1 is a block diagram illustrating a hardware configuration of an image processing apparatus according to an exemplary embodiment.

First, a first exemplary embodiment will be described. FIG. 1 is a block diagram illustrating a hardware configuration of an example of an image processing apparatus 100 as a job processing apparatus according to the first exemplary embodiment.

<Hardware Configuration of Image Processing Apparatus>

Referring to FIG. 1, a central processing unit (CPU) 111, a random access memory (RAM) 112, a read-only memory (ROM) 113, an input unit 114, a display control unit 115, external memory interface (I/F) 116, a communication I/F controller 117, a printer I/F 118, and a scanner I/F 119 are each connected to a system bus 110. A touch panel 120, hardware keys 121, a display 122, an external memory 123, a printer 124, and a scanner 125 are connected to the system bus 110 via the respective I/Fs and the like. The units connected to the system bus 110 are configured to exchange data with each other through the system bus 110.

The ROM 113 is a nonvolatile memory. The ROM 113 stores image data, data other than image data, and various programs which are used for the CPU 111 to operate in respectively predetermined areas. The RAM 112 is a volatile memory and is used as a temporary storage area, such as a main memory or a work area for the CPU 111. The CPU 111, for example, controls each member (e.g., unit, component) of the image processing apparatus 100 by using the RAM 112 as a work memory based on programs stored in the ROM 113. Not limited to storage in ROM 113, the programs used for the CPU 111 to operate may be stored in the external memory (such as a hard disk (HD)) 123 in advance.

The input unit 114 receives a user's operation, generates a control signal according to the operation, and supplies the generated control signal to the CPU 111. The input unit 114 serves as an input device that receives the user's operation and is connected to each of the touch panel 120 and the hardware keys 121. The touch panel 120 is, for example, an input device configured to output coordinate information corresponding to a touched position on the input unit 114 having a planer configuration. The touch panel 120 may be any of various types of touch panels, such as a resistive type, a capacitive type, a surface acoustic wave type, an infrared type, an electromagnetic induction type, an image recognition type, and an optical sensor type. The hardware keys 121 are input devices that can be physically pressed, such as numeric keys, a start key, and a stop key. The input unit 114 generates the control signal based on the user's operation performed on the input devices. Based on the control signal, the CPU 111 controls each unit of the image processing apparatus 100 according to the programs. In such a manner, it is possible to cause the image processing apparatus 100 to perform an operation according to the user's operation.

The display control unit 115 outputs a display signal for displaying an image on the display 122. For example, a display control signal that is generated by the CPU 111 based on a program is supplied to the display control unit 115. The display control unit 115 generates the display signal based on the display control signal and outputs the generated display signal to the display 122. For example, the display control unit 115 causes the display 122 to display a Graphical User Interface (GUI) screen constituting a GUI based on the display control signal generated by the CPU 111.

The touch panel 120 is formed integrally with the display 122. For example, the touch panel 120 is configured to prevent the transmittance of light from inhibiting the display on the display 122, and is attached to an upper layer of a display surface of the display 122. Input coordinates on the touch panel 120 are associated with display coordinates on the display 122. In this manner, a GUI which enables a user to feel that he or she directly operates the screen displayed on the display 122 can be configured.

The external memory I/F 116 is configured such that, for example, the external memory 123, such as an HD, a floppy disk (FD), a compact disc (CD), a digital versatile disc (DVD), and a memory card, is mountable on the external memory I/F 116. The external memory I/F 116 reads data from the mounted external memory 123 and writes data into the external memory 123 based on the control operation performed by the CPU 111. The communication I/F controller 117 performs communication via various types of networks 203, such as a local area network (LAN), the Internet, and wired or wireless networks, based on the control operation performed by the CPU 111. The scanner I/F 119 controls an image input from the scanner 125. The printer I/F 118 controls an image output to the printer 124 serving as an image forming unit.

<Network Configuration>

Figure 2:
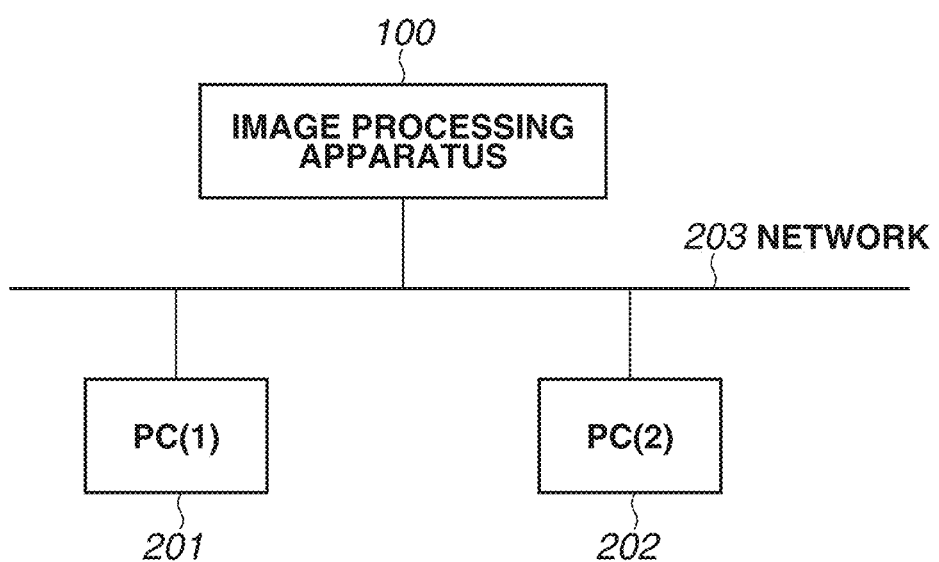
FIG. 2 is a block diagram illustrating a network configuration of a system in which the image processing apparatus operates.

FIG. 2 is a block diagram illustrating an example of a configuration of a network system to which the image processing apparatus 100 illustrated in FIG. 1 is connected. In the example illustrated in FIG. 2, a personal computer (PC)(1) 201 and a PC(2) 202 are each connected to the image processing apparatus 100 via the network 203. The PC(1) 201 is an authentication server apparatus, and the PC(2) 202 is a terminal used for the user to input a print job. Although FIG. 2 illustrates an example in which two PCs (i.e., the PC(1) 201 and the PC(2) 202) are provided, a larger number of PCs may be connected to the network 203.

<Hardware Configuration of PC>

Figure 3:
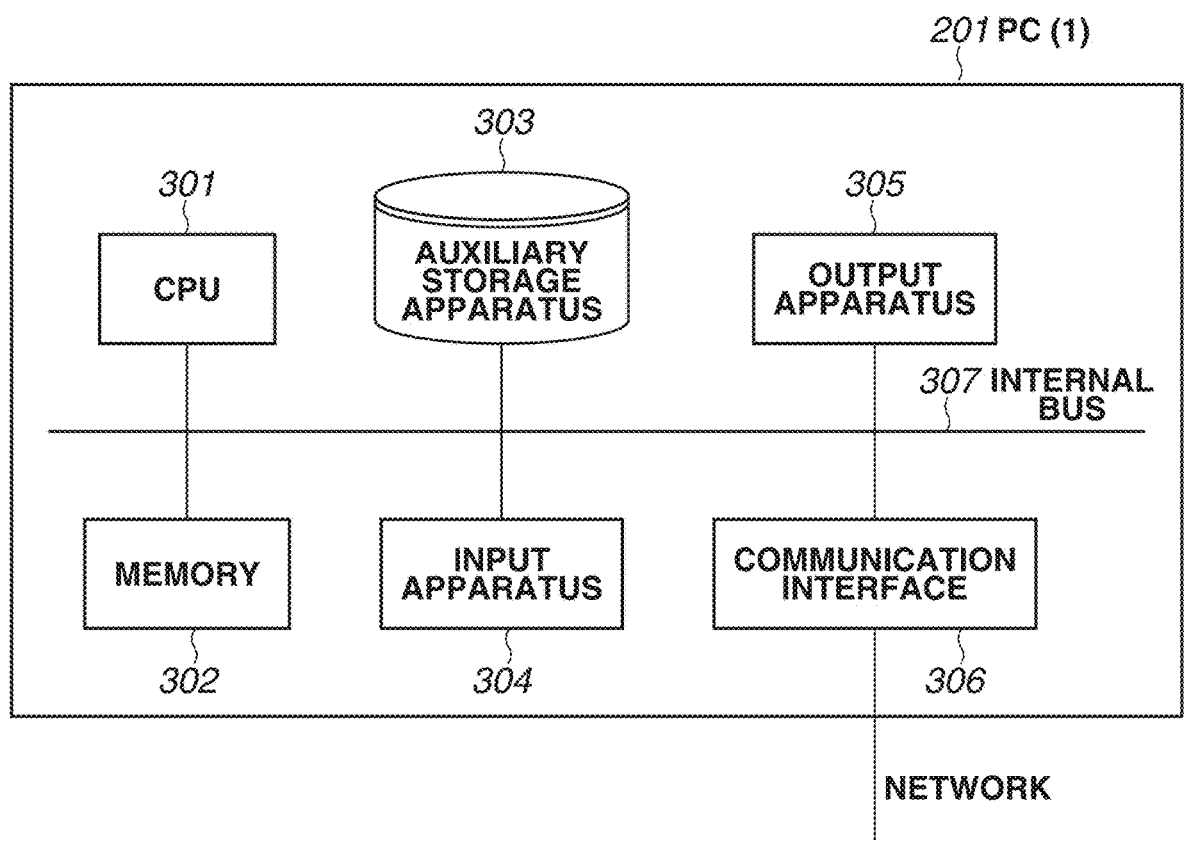
FIG. 3 is a block diagram illustrating a hardware configuration of a personal computer (PC) constituting the system.

FIG. 3 is a block diagram illustrating an example of the hardware configuration of each of the PC(1) 201 and the PC(2) 202 illustrated in FIG. 2. Since the PC(1) 201 and the PC(2) 202 have the same hardware configuration, the hardware configuration of the PC(1) 201 will be described below as a representative example.

The PC(1) 201 includes a CPU 301, a memory 302, an auxiliary storage apparatus 303, an input apparatus 304, an output apparatus 305, and a communication interface 306, which are connected to each other via an internal bus 307.

The CPU 301 controls the entire PC(1) 201 in an integrated manner. The memory 302 includes a RAM and a ROM. The memory 302 stores programs and various data. The auxiliary storage apparatus 303 is, for example, a large-capacity storage apparatus, such as an HD. The auxiliary storage apparatus 303 stores large volume data and holds program executable codes. For example, the auxiliary storage apparatus 303 stores data that needs to be held for a longer period of time than data to be stored in the memory 302.

The input apparatus 304 is a keyboard, a pointing device, or the like. The user can input various instructions to the PC(1) 201 using the input apparatus 304. The output apparatus 305 is a display apparatus, such as a display. Processing executed by the CPU 301 is displayed on the output apparatus 305. The communication interface 306 transmits and receives digital data via the network 203.

<Processing Functions (Programs) of Image Processing Apparatus>

Figure 4:
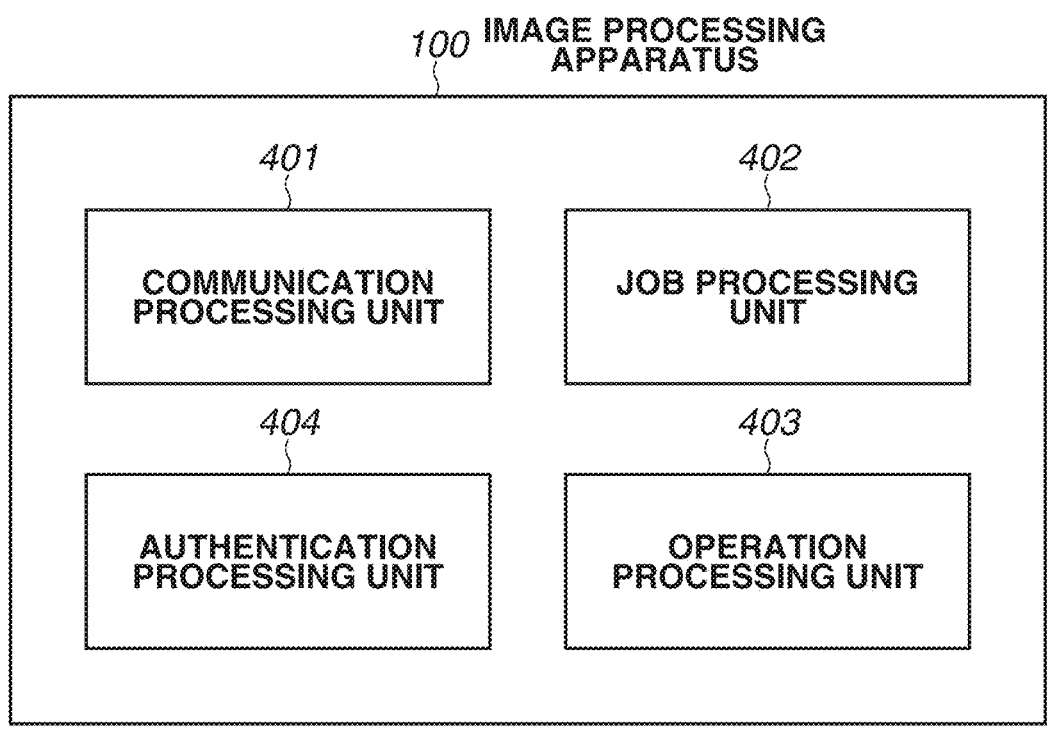
FIG. 4 is a block diagram illustrating a system configuration within a controller of the image processing apparatus.

FIG. 4 is a block diagram illustrating an example of processing functions of the image processing apparatus 100 illustrated in FIG. 1. The image processing apparatus 100 includes, as its functions, a communication processing unit 401, a job processing unit 402, an operation processing unit 403, and an authentication processing unit 404. These processing units are implemented in such a manner that the CPU 111 loads programs stored in the ROM 113 or the external memory 123 into the RAM 112 and executes the loaded programs.

The communication processing unit 401 executes communication control and analysis of communication commands to be transmitted to or received from the PC(1) 201 or the PC(2) 202, which are connected to the network 203, via the communication I/F controller 117.

The job processing unit 402 executes various job processes to be executed by the image processing apparatus 100. Specifically, the job processing unit 402 executes a print job by controlling the printer 124, executes a scanning (reading) job by controlling the scanner 125, and executes a transmission job by controlling the communication I/F controller 117. In addition, the job processing unit 402 executes a copy job for scanning a document and printing the scanned document image by controlling the scanner 125 and the printer 124. The job processing unit 402 also controls processing for stopping or cancelling various jobs described above.

The operation processing unit 403 displays various information for the user on the display 122 by controlling the display control unit 115. Further, the operation processing unit 403 receives an operation instruction, which is input by the user from the hardware keys 121 and the touch panel 12 via the input unit 114, and executes processing.

Upon receiving a login/log-out request from the user, the authentication processing unit 404 communicates with the authentication server (PC(1) 201) to perform user authentication and executes management processing on the user who uses the image processing apparatus 100.

<Function Blocks of User Authentication Server>

Figure 5:
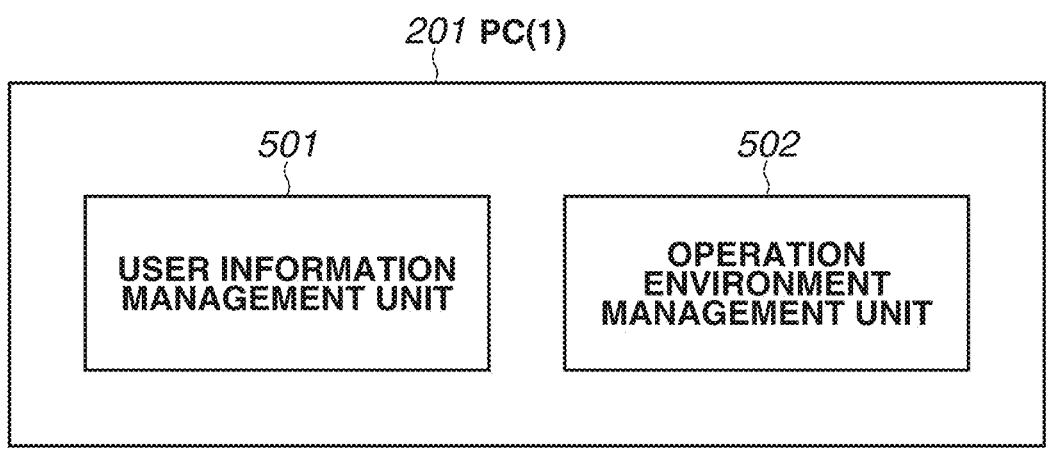
FIG. 5 is a block diagram illustrating a system configuration of a user authentication server.

FIG. 5 is a block diagram illustrating an example of functions of the PC(1) 201 illustrated in FIG. 2.

The PC(1) 201 described above with reference to FIG. 3 is a user authentication server. The PC(1) 201 includes, as its functions, a user information management unit 501 and an operation environment management unit 502.

The user information management unit 501 manages information for authenticating the user about whom an inquiry is made via the communication interface 306 from the terminal (the other PC(2) 202 or the image processing apparatus 100) connected to the network 203.

Figure 6:
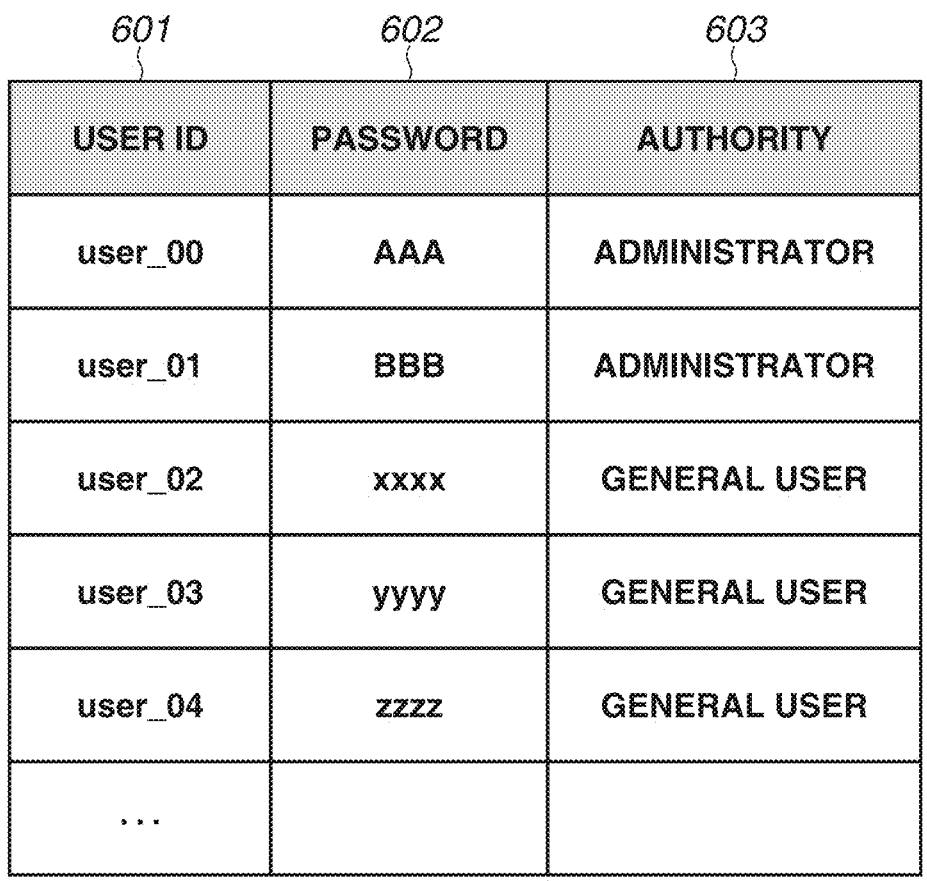
FIG. 6 is a table illustrating information to be managed by a user information management unit.

FIG. 6 is a table that schematically illustrates information to be managed by the user information management unit 501. For each user, a user ID 601, a password 602, and an authority 603, which are user identification information, are stored. The authority 603 indicates an "administrator" or a "general user". The password 602 is desirably stored by obtaining a hash value of the password and encrypting the hash value, instead of storing the password in plain text.

The operation environment management unit 502 manages operation environment information for each user managed in the user information management unit 501. In the present exemplary embodiment, the operation environment management unit 502 manages, for example, information for customizing an operation screen to be displayed on the display 122 for each user, as the operation environment information. The information for customizing the operation screen for each user is, for example, a language used in display of the screen. The operation screen is displayed on the display 122 based on the operation environment information managed by the operation environment management unit 502 when the user logs in to the image processing apparatus 100. As a result, the operation screen that can be easily used by the user can be provided.

In the present exemplary embodiment, the PC(1) 201 serving as the user authentication server includes the user information management unit 501 and the operation environment management unit 502. Alternatively, the image processing apparatus 100 may include at least one of the user information management unit 501 and the operation environment management unit 502.

<User Login>

In this exemplary embodiment, the user first logs in to the PC(2) 202 to which a job is input. FIG. 7 illustrates an example of a login screen to be displayed on the output apparatus 305 of the PC(2) 202. Using the input apparatus 304, the user inputs a logged-in user ID into a user name entry field 701 and inputs a password into a password entry field 702 and then presses a "login" button 703, to thereby make a login request.

After logging in to the PC(2) 202, the user starts application software, such as a word processor and spreadsheet software, and calls a screen for inputting a print job from the application software.

Figure 8:
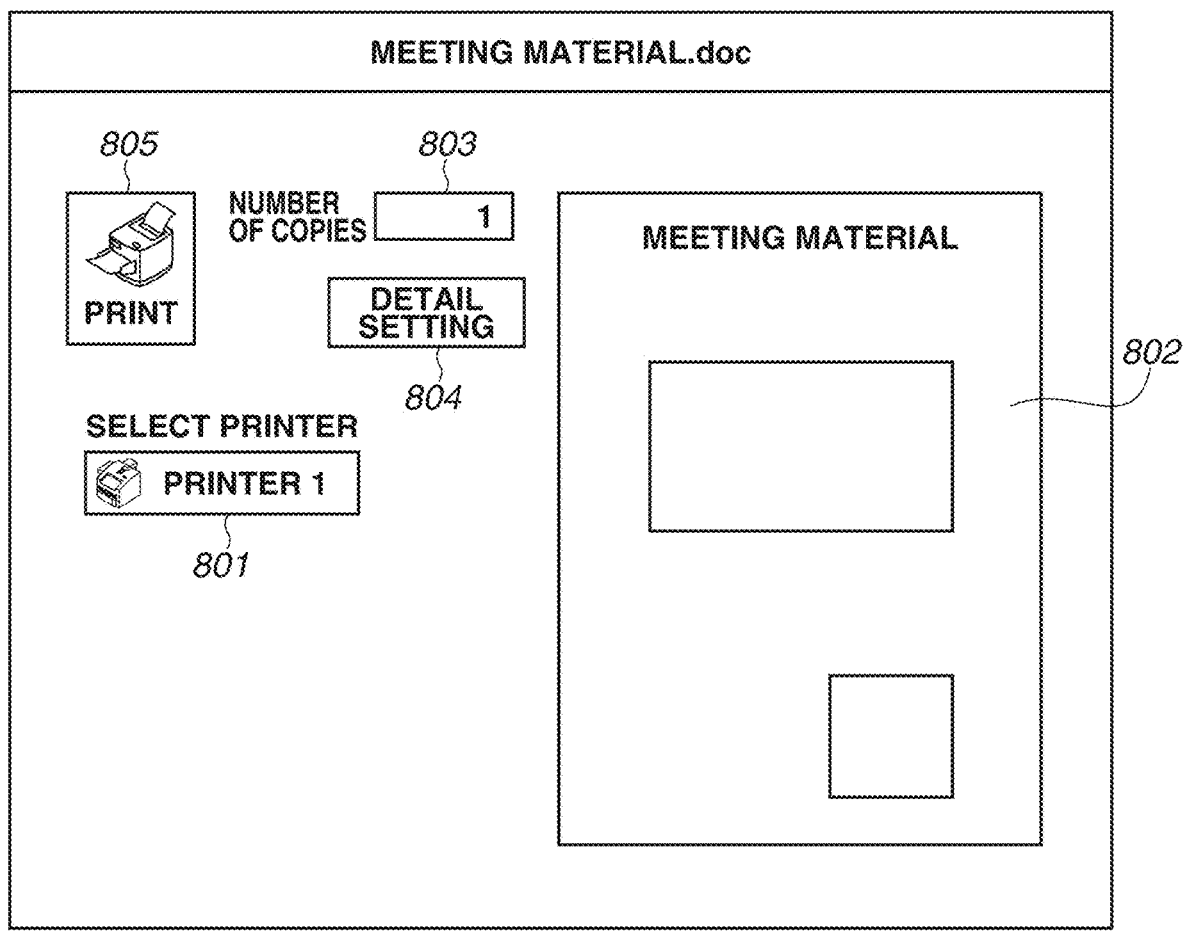
FIG. 8 illustrates a print job input screen to be displayed on the output apparatus of the PC(2).

FIG. 8 illustrates an example of a screen for inputting a print job to be displayed on the output apparatus 305 of the PC(2) 202. A printer select pulldown menu 801 allows the user to select an output destination printer from a printer list that is preliminarily set in the PC(2) 202. Assume herein that the image processing apparatus 100 that is displayed as "printer 1" is selected as an output destination printer. In a preview display area 802, a preview image for a print output is displayed. In a number-of-copies setting area 803, the user can input the number of printing copies using the input apparatus 304. A detail setting button 804 is a button for setting details about printing. In the case of setting details about printing, such as processing using a finisher and two-sided printing, the user presses the detail setting button 804 via the input apparatus 304 and sets details on a screen (not illustrated) to be displayed. By pressing a print start button 805, a print job is transmitted to the printer selected from the printer select pulldown menu 801.

<Login Screen of Image Processing Apparatus>

Figure 9:
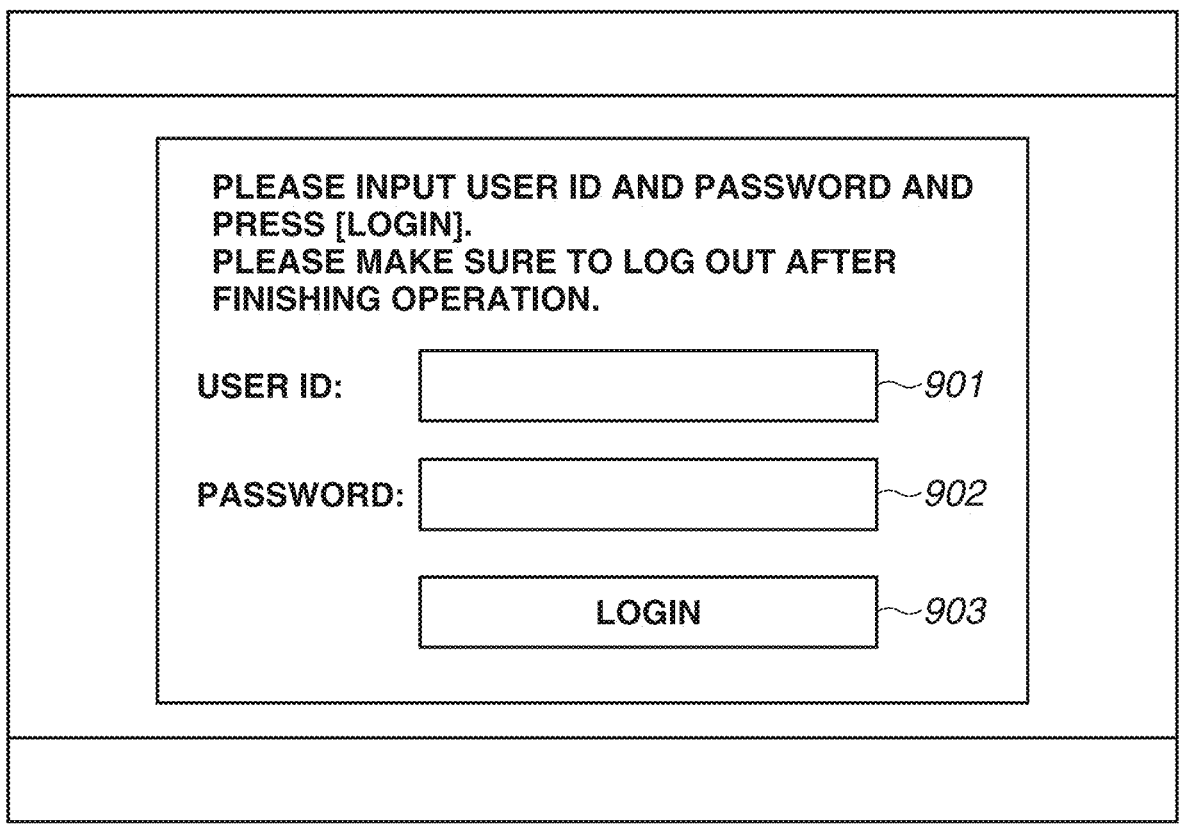
FIG. 9 illustrates a login screen to be displayed on a display of the image processing apparatus.

For example, if the user has noticed an error in the transmitted job after the print job is input to the image processing apparatus 100 and wishes to cancel the print job, the user first logs in to the image processing apparatus 100. FIG. 9 illustrates an example of an authentication screen to be displayed on the display 122 of the image processing apparatus 100. The user inputs a user ID into a user ID entry field 901, inputs a password into a password entry field 902, and then presses a button 903, to thereby execute login processing.

Figure 10:
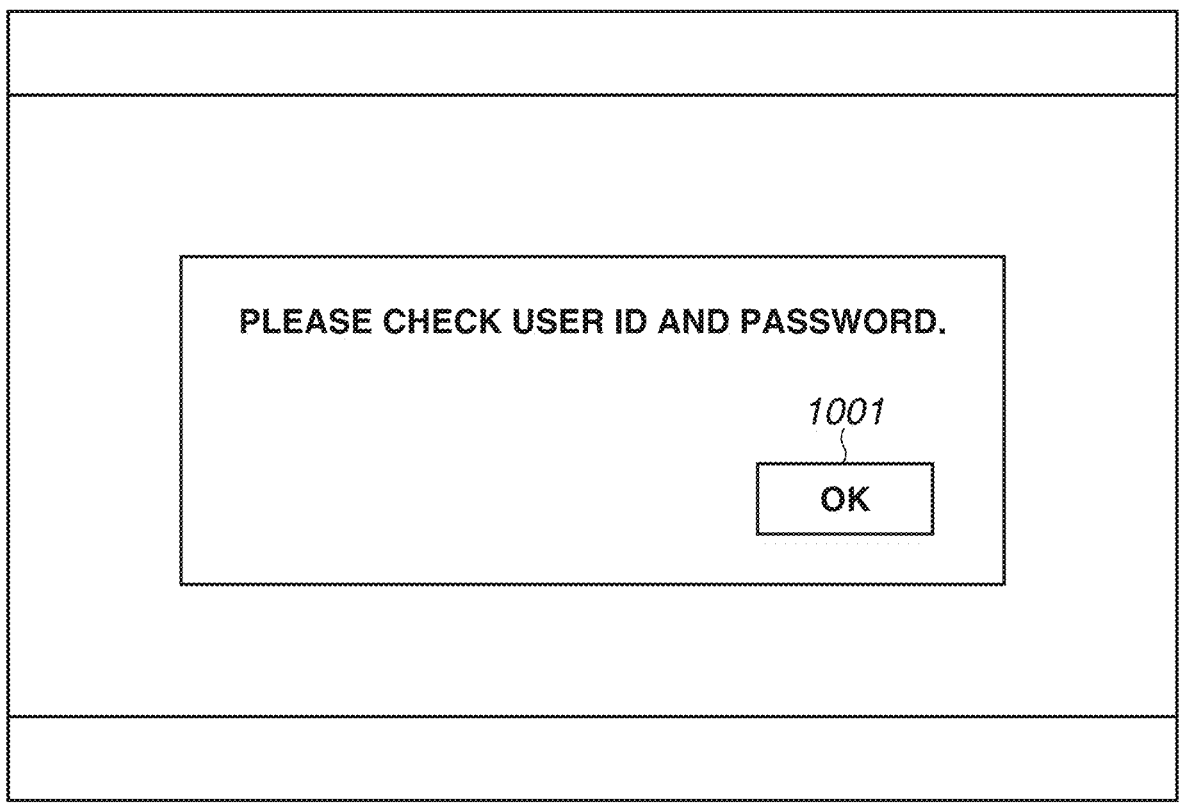
FIG. 10 illustrates an authentication failure screen to be displayed on the display of the image processing apparatus.

If the user is not authenticated by the input user ID and password, an error screen for prompting the user to check the user ID and password, for example as illustrated in FIG. 10, is displayed. When the user performs a tapping operation on an "OK" button 1001 on the error screen illustrated in FIG. 10, the login screen illustrated in FIG. 9 is displayed again on the display 122.

Figure 11:
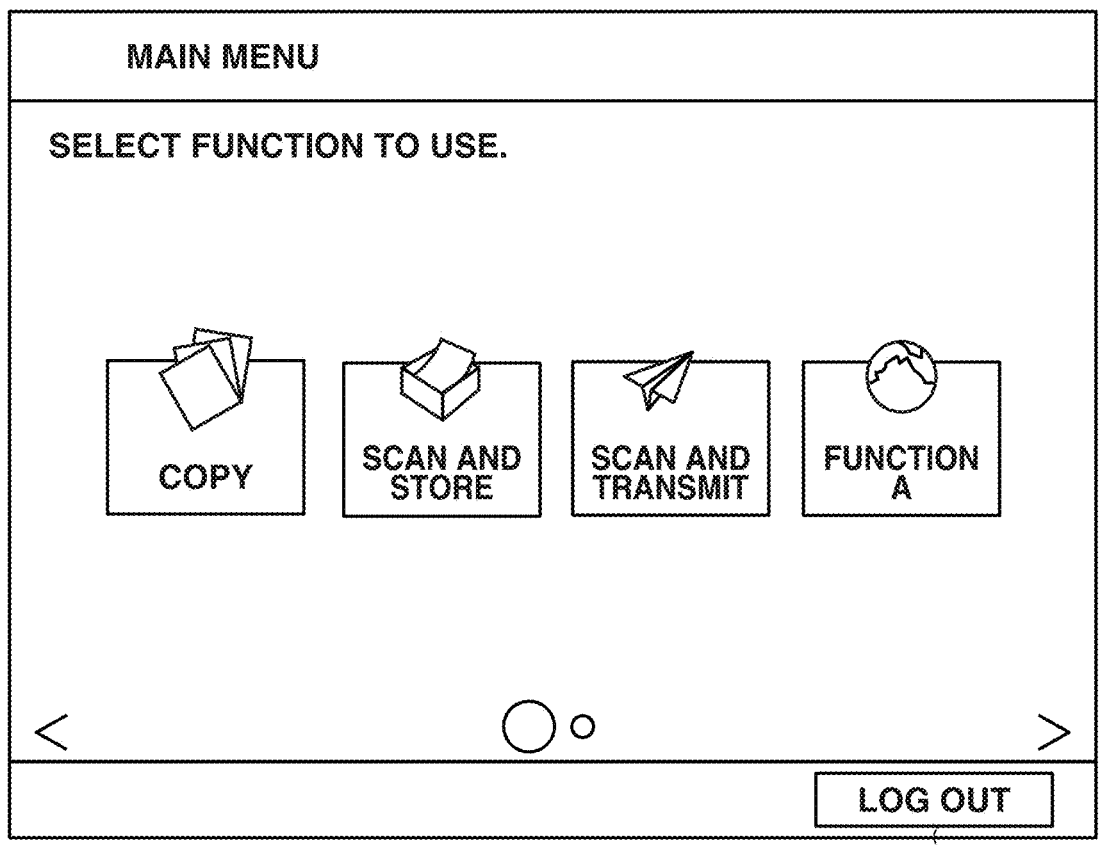
FIG. 11 illustrates an operation screen to be displayed on the display of the image processing apparatus.

If the user is successfully authenticated, a main menu screen illustrated in FIG. 11 is displayed. The main menu screen is a screen that allows the user to select a function to be used. The description below is given using a case where a user of which the user ID is "user_00" has logged in to the image processing apparatus 100.

Figure 12:
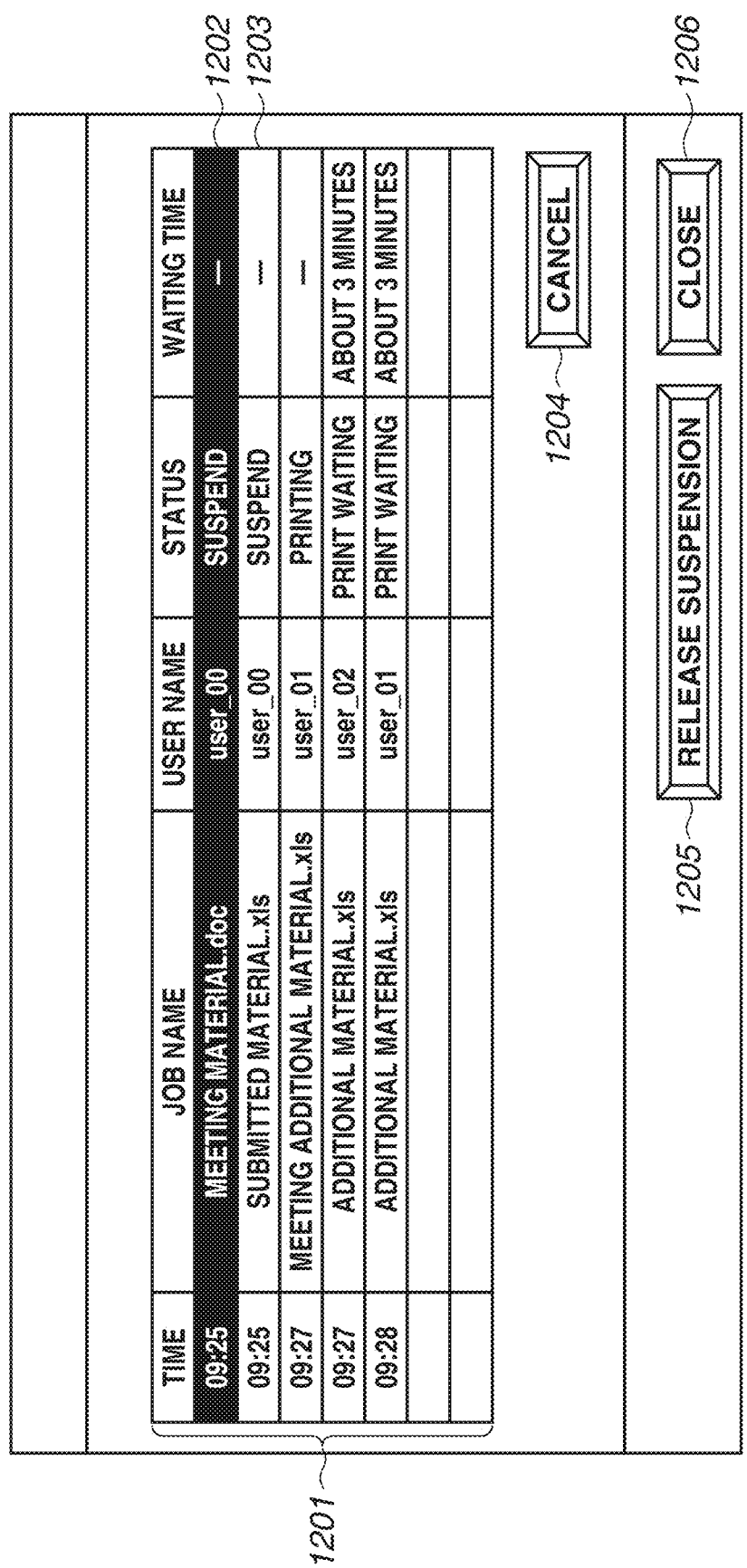
FIG. 12 illustrates a print suspension screen to be displayed on the display of the image processing apparatus.

Assume that the user has pressed the stop key when the screen illustrated in FIG. 11 is displayed on the display 122. The print jobs input by the user with the user ID "user_00" are suspended, and a screen illustrated in FIG. 12 is displayed on the display 122. Then, the image processing apparatus 100 starts execution of the other jobs that are not suspended.

Suspending the input print jobs means that the image processing apparatus 100 performs control such that the jobs input by the user with the user ID "user_00" are not executed. Specifically, the image processing apparatus 100 changes a job status of each job that has been input by the user with the user ID "user_00" and has not been executed yet from "print waiting" to "suspend". With this configuration, it is possible to prevent the execution of jobs that have been input by the user with the user ID "user_00" and not started to be executed yet from being started.

<Job Cancel Processing Screen of Image Processing Apparatus>

In a print job list 1201, a reception time at which the job is received by the image processing apparatus 100, a job name, a user name of a user who has input the job, an execution status, and a waiting time for execution of the job are displayed for each job received by the image processing apparatus 100. The screen illustrated in FIG. 12 is an example of a screen to be displayed when the user with the user ID "user_00" logs in to the image processing apparatus 100 and performs a print job suspension operation. Accordingly, jobs 1202 and 1203 input by the user with the user ID "user_00" are in a suspended state. Each row in the print job list 1201 is selectable, and the selected row is highlighted. In this example, the job 1202, which is one of the suspended jobs, is selected and highlighted.

The other jobs that have been instructed to be executed subsequent to the jobs 1202 and 1203 are jobs instructed by users different from the user with the user ID "user_00". The jobs are thus not suspended.

A "cancel" button is a button for canceling a job. The user can cancel the selected and highlighted job (job 1202 in this screen example) by pressing the "cancel" button 1204. A "release suspension" button 1205 is a button for releasing a job. When the user presses the "release suspension" button 1205, the CPU 111 releases the suspended state of the suspended job (job 1202 or 1203 in this screen example), and changes the job status to "print waiting". A "close" button 1206 is a button for closing the screen.

Although print job list 1201 displays all jobs in this example, only suspended jobs on which cancellation processing can be performed by the user may be listed.

In such a manner, the user can perform the suspension operation on the print job, which is input from the PC(2) 202, in the image processing apparatus 100. In this case, a print output operation is continuously performed without suspending the other jobs input by users other than the user with the user ID "user_00", thereby preventing the productivity of the jobs input by the other users from being impaired.

<Print Job Cancel Processing Flow>

Next, processing for cancelling a print job will be described with reference to FIGS. 13 to 16.

Figure 13:
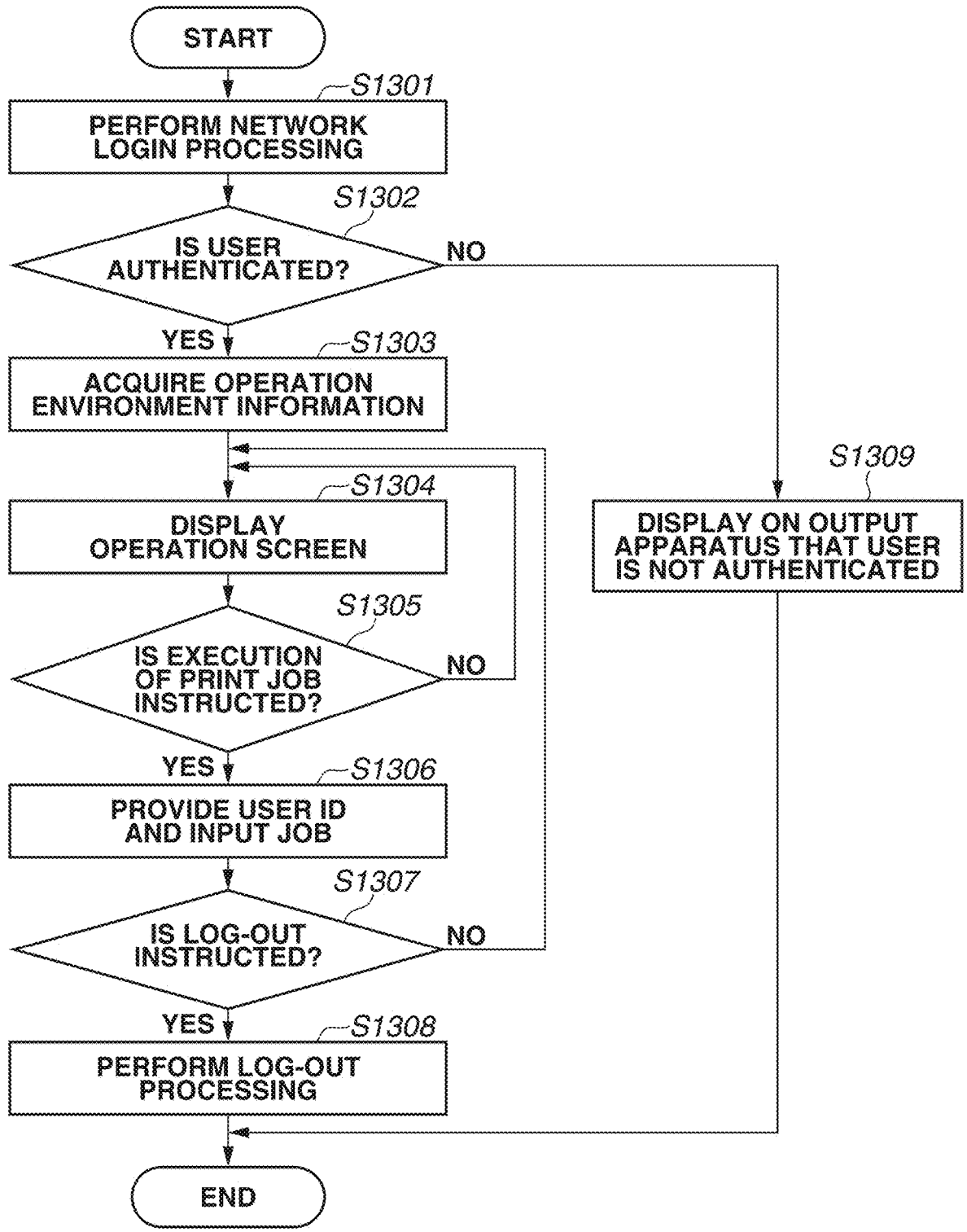
FIG. 13 is a flowchart illustrating a flow of processing from authentication to job input to the image processing apparatus, which is executed in the PC.

FIG. 13 is a flowchart illustrating processing to be performed when a print job is input to the image processing apparatus 100 from the PC(2) 202 illustrated in FIG. 2. In the case where a print job is input to the image processing apparatus 100 from the PC(2) 202, in step S1301, the user inputs user information for identifying the user to the PC(2) 202 via the input apparatus 304 and logs in to the user authentication server (PC(1) 201). Specifically, the information for identifying the user is a user ID and a password that are input on the screen illustrated in FIG. 9.

Accordingly, the CPU 301 sends the user information to the user authentication server PC(1) 201 via the communication interface 306. Then, in the user authentication server PC(1) 201, the CPU 301 performs user authentication based on the user information, and sends, to the PC(2) 202, user authentication information indicating whether the user can be authenticated. To input the user information, an authentication apparatus, such as an integrated circuit (IC) card, and a biometric authentication apparatus using fingerprint authentication, vein authentication, and the like can also be used in addition to the method using the input apparatus 304.

In step S1302, the CPU 301, in the PC(2) 202, confirms whether the user is authenticated by the user authentication server PC(1) 201 based on the user authentication information. If the user is not authenticated (NO in step S1302), the processing proceeds to step S1309. In step S1309, the CPU 301 displays information indicating that the user is not authenticated on the output apparatus 305, and then the processing is terminated.

On the other hand, if the user is authenticated (YES in step S1302), the processing proceeds to step S1303. In step S1303, the CPU 301 acquires the operation environment information corresponding to the user information from the user authentication server PC(1) 201. In this case, the operation environment information acquired from the user authentication server PC(1) 201 is, for example, information about a background image on the desktop of a user's PC and is setting information about window and text colors and a font. In step S1304, the CPU 301 displays an operation screen (terminal operation display screen) on the output apparatus 305 based on the operation environment information. Specifically, the user executes some application on the PC(2) 202.

Next, in step S1305, the CPU 301 monitors whether the execution of the print job is instructed. The execution of the print job is instructed by a predetermined operation on the operation screen. If the execution of the print job is not instructed (NO in step S1305), the processing returns to step S1304 to display the operation screen for the application. Then, the CPU 301 continuously monitors whether the execution of the print job is instructed in step S1305.

If the execution of the print job is instructed (YES in step S1305), the processing proceeds to step S1306. In step S1306, the CPU 301 provides the print job with the user ID of the user who has executed the job, and the CPU 301 inputs the print job to the image processing apparatus 100. The image processing apparatus 100 to which the print job has been input executes processing (print job) for printing based on the received print data.

In step S1307, the CPU 301 monitors whether a log-out instruction is input from the input apparatus 304. The log-out instruction is input in such a manner that, for example, the user issues the log-out instruction by pressing a "log-out" button 1101 on the operation screen displayed on the output apparatus 305. If log-out is not instructed (NO in step S1307), the processing returns to step S1304 and the CPU 301 continues processing to monitor the log-out processing. On the other hand, if log-out is instructed (YES in step S1307), the processing proceeds to step S1308. In step S1308, the CPU 301 performs the log-out processing, and then the CPU 301 terminates the series of processes.

<Print Processing Operation of Image Processing Apparatus>

Next, the operation of the image processing apparatus 100 that has received the print job transmitted from the PC(2) 202 in the processing illustrated in FIG. 13 will be described. When the print job is transmitted to the image processing apparatus 100 from the PC(2) 202 or the like, the CPU 111 of the image processing apparatus 100 receives the print job via the communication processing unit 401 and registers the job in a print job queue owned by the job processing unit 402. Further, the job processing unit 402 sequentially reads out jobs from the print job queue and drives the printer 124 to execute print processing.

FIG. 14 is a table schematically illustrating a print job queue. Jobs transmitted from the PC(2) 202 or the like are sequentially input to the print job queue. Each job includes pieces of information including a job ID 1401, a job execution user ID 1402, a job name 1403, a reception date and time 1404, and a status 1405. The job ID 1401 is identification information for uniquely identifying a job and is uniquely provided at the time when the job is input to the print job queue. The job execution user ID 1402 is identification information for uniquely identifying the user who has input the job and is included in data received by the communication processing unit 401. Specifically, the job execution user ID 1402 is the user ID provided in step S1306 illustrated in FIG. 13.

The job name 1403 is a name given to a job and is included in job data received by the communication processing unit 401. The reception date and time 1404 is a date and time when the job is input to the print job queue. The status 1405 indicates the current status of the job. The status 1405 is one of "being executed", "print waiting", and "being suspended". The status "being executed" indicates a job in which print processing is currently executed. The status "print waiting" indicates a job in a state of waiting for print processing to be executed. The status "being suspended" indicates a job in which print processing is suspended by a user's operation as described below.

The job processing unit 402 sequentially reads out jobs in the status of "print waiting" from the print job queue and drives the printer 124 to start print processing. At the same time, the job processing unit 402 changes the status 1405 of the job to "being executed". After printing for the job is finished, the job is deleted from the print job queue, and the processing of reading out the subsequent job in the status of "print waiting" and of print processing are repeatedly performed.

<Login Processing in Image Processing Apparatus>

Figure 15:
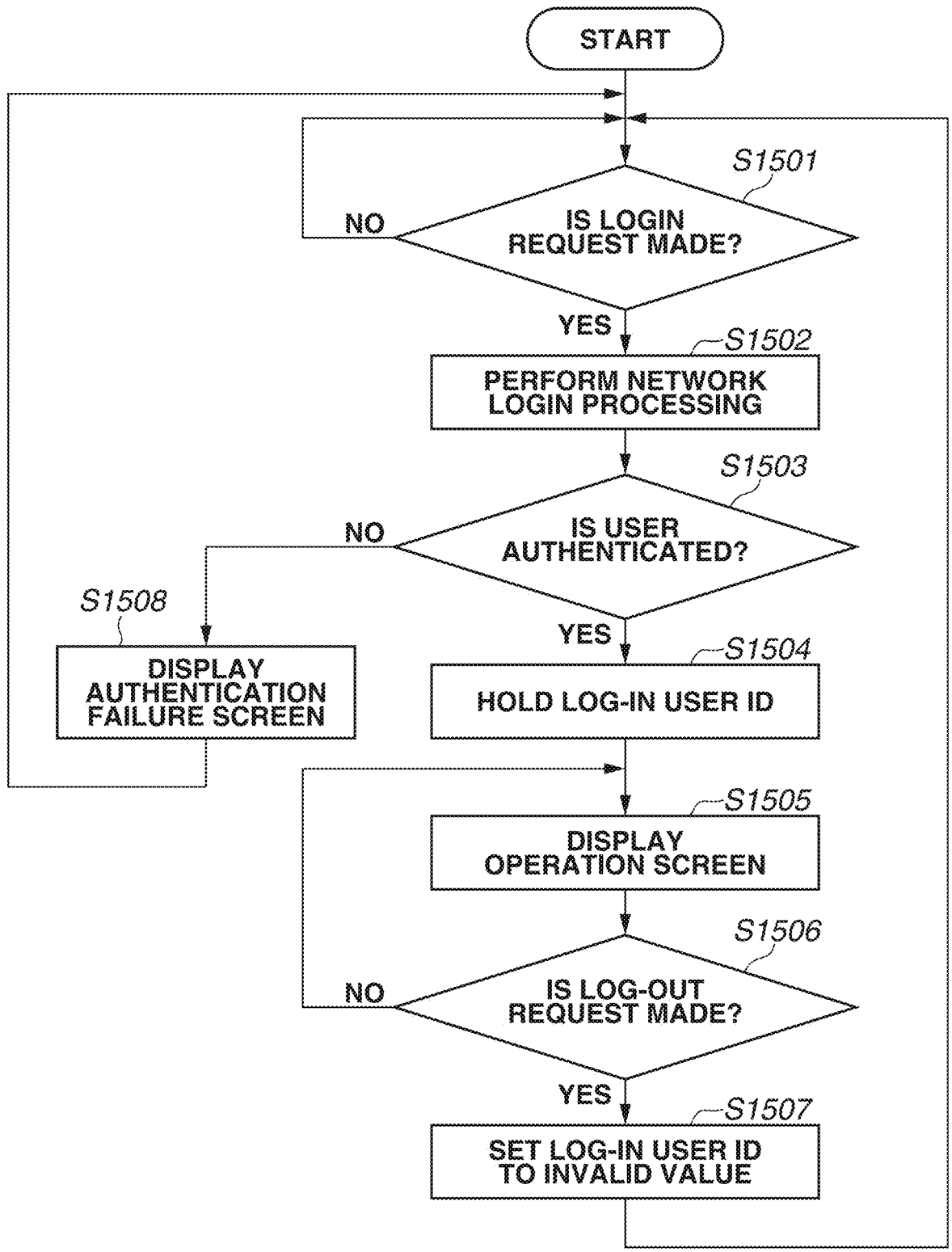
FIG. 15 is a flowchart illustrating login processing performed by the image processing apparatus.

Next, authentication processing in the image processing apparatus 100 will be described with reference to a flowchart illustrated in FIG. 15. The authentication processing in the flowchart illustrated in FIG. 15 is executed when the CPU 111 causes each function unit of the image processing apparatus 100 to operate.

In step S1501, the CPU 111 determines whether a login request is made. The login screen is displayed on the display 122, and when the user inputs an ID and a password using the hardware keys 121 and the touch panel 120, the login request is made. FIG. 9 illustrates an example of the login screen to be displayed on the display 122. The user inputs the logged-in user ID into the user ID entry field 901, inputs the password into the password entry field 902, and then presses the "login" button 903, to thereby make the login request.

The login request can also be made based on an input from an IC card reader or a biometric authentication apparatus, such as a fingerprint authentication apparatus, which is connected to the image processing apparatus 100. If it is determined that the login request is made (YES in step S1501), the processing proceeds to step S1502. In step S1502, the CPU 111 performs network login processing for logging in to the user authentication server PC(1) 201. Specifically, the CPU 111 sends the information about the user ID and password input by the user on the screen illustrated in FIG. 9 to the user authentication server PC(1) 201 via the communication processing unit 401. The authentication server PC(1) 201 compares the transmitted information with the information (FIG. 6) managed by the user information management unit 501, thereby performing authentication processing.

Next, in step S1503, it is confirmed whether the user is authenticated by the user authentication server PC(1) 201. If the user is authenticated (YES in step S1503), the processing proceeds to step S1504. If the user is not authenticated (NO in step S1503), the processing proceeds to step S1508. In step S1508, the CPU 111 displays a screen indicating that the authentication is unsuccessful on the display 122. Then, the processing returns to S1501, and the image processing apparatus 100 is brought into a login waiting state.

FIG. 10 illustrates an example of an authentication failure screen to be displayed on the display 122 in step S1508. If the user is authenticated (YES in step S1503), then in step S1504, the CPU 111 stores the user ID (logged-in user ID) of the logged-in user in the RAM 112. Next, in step S1505, the CPU 111 displays the operation screen of the image processing apparatus 100 on the display 122.

FIG. 11 illustrates an example of the screen to be displayed on the display 122 in step S1505. The user can perform various operations on the image processing apparatus 100 by operating the displayed operation screen. Next, in step S1506, the CPU 111 determines whether a log-out request is made. The log-out request is made when the "log-out" button 1101 on the operation screen displayed on the display 122 is pressed, or when an operation input has not been made by the user for a certain period of time. If it is determined that the log-out request is made (YES in step S1506), the processing proceeds to step S1507. In step S1507, the CPU 111 discards the logged-in user ID stored in step S1504 and stores an invalid value (a value indicating that there is no logged-in user). Then, the processing returns to step S1501. By the above-described processing, the CPU 111 (authentication processing unit 404) of the image processing apparatus 100 can recognize whether there is any user who is currently logged in to the image processing apparatus 100. If there is a user who is currently logged in to the image processing apparatus 100, the CPU 111 can constantly recognize the user ID of the logged-in user.

<Print Suspension Processing Flow>

Figure 16:
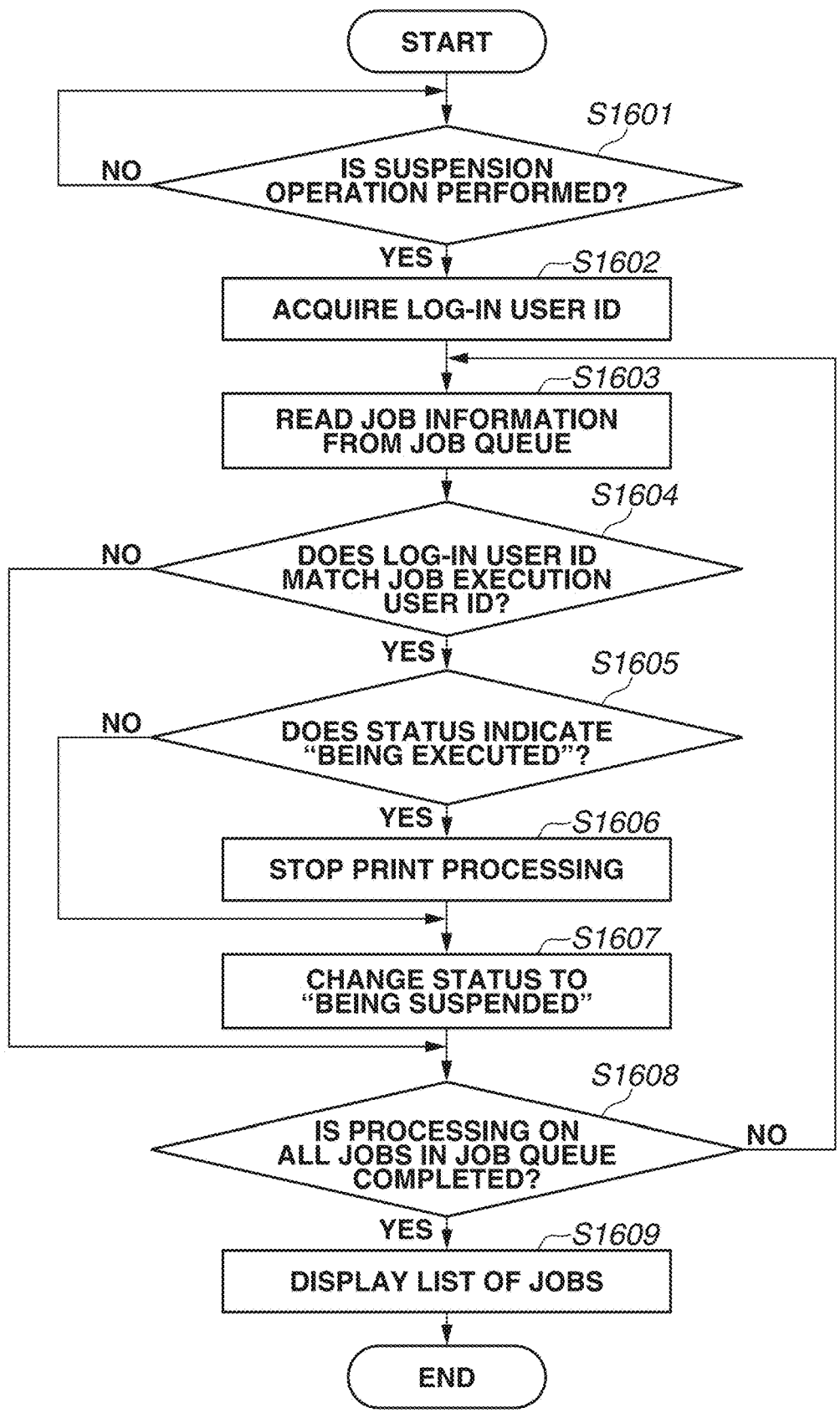
FIG. 16 is a flowchart illustrating job suspension processing performed by the image processing apparatus.

Referring to a flowchart illustrated in FIG. 16, print suspension processing in the image processing apparatus 100 will be described. The print suspension processing in the flowchart illustrated in FIG. 16 is implemented in such a manner that the CPU 111 executes processing for each function unit of the image processing apparatus 100.

In step S1601, the CPU 111 determines whether a job suspension operation is performed by the user. Specifically, the CPU 111 determines whether the "stop key", which is one of the hardware keys 121, is pressed. Also, a "stop button" may be provided as a software key on the operation screen displayed on the display 122, and the CPU 111 can determine whether the stop button is pressed. If the CPU 111 determines that the suspension operation is performed (YES in step S1601), the processing proceeds to step S1602.

In step S1602, the CPU 111 acquires the user ID (logged-in user ID) of the user who is currently logged in. The logged-in user ID is the user ID stored in step S1504 in the flowchart illustrated in FIG. 15. Next, in step S1603, the CPU 111 sequentially reads out job information piece by piece from the print job queue, and then the processing proceeds to step S1604.

In step S1604, the CPU 111 determines whether the logged-in user ID matches the job execution user ID 1402 of the job read from the print job queue. For example, in a case where the user ID (logged-in user ID) of the user who is currently logged in to the image processing apparatus 100 is "user_00", the CPU 111 determines that the job execution user ID 1402 of the job in the print job queue matches the logged-in user ID if the job execution user ID 1402 is "user_00". If it is determined that the job execution user ID 1402 of the job does not match the user ID "user_00" (NO in step S1604), the processing proceeds to step S1608. If it is determined that the job execution user ID 1402 of the job matches the user ID "user_00" (YES in step S1604), the processing proceeds to step S1605.

In step S1605, the CPU 111 checks the status of the read job and determines whether the status 1405 indicates "being executed". If it is determined that the status 1405 does not indicate "being executed" (NO in step S1605), the processing proceeds to step S1607. If it is determined that the status 1405 indicates "being executed" (YES in step S1605), the processing proceeds to step S1606. In step S1606, the CPU 111 stops the print processing for the job. Specifically, the CPU 111 performs discharge processing for discharging sheets already fed into the image processing apparatus 100 so as to prevent the sheets from remaining in the image processing apparatus 100, and the CPU 111 performs control such that a new sheet is fed into the image processing apparatus 100. Then, in step S1607, the status of the read job is changed to "being suspended". More specifically, for a print job for which printing of an image has been already started, the image formation is stopped, and the image instructed in the print job is not to be formed until an instruction to release the suspension is made. For a print job in the print waiting status, for which image formation has not been started, the image processing apparatus 100 does not execute the image formation designated in the print job until an instruction to release the suspension is made.

Next, in step S1608, the CPU 111 determines whether the processing on all jobs in the print job queue is completed. If it is determined that the print job queue includes an unprocessed job (NO in step S1608), the processing returns to step S1603. In step S1603, the CPU 111 reads the next job information from the print job queue. If it is determined that the processing on all jobs is completed (YES in step S1608), the processing proceeds to step S1609. In step S1609, the CPU 111 displays a screen for displaying a job list including suspended jobs on the display 122, and then the processing is terminated. After the processing in the flowchart illustrated in FIG. 16 is completed, the image processing apparatus 100 starts execution of jobs with a job status other than the "being suspend" status.

As described above, in the image processing apparatus 100 according to the present exemplary embodiment, when the user presses the stop key, the job input by the user is brought into the suspend state, and the job list screen is displayed. The user can select a job that the user wants to cancel from the job list screen and perform a cancellation operation of the selected job. Even in a case where the user's jobs are being suspend, print processing is executed without stopping jobs input by other users, thereby preventing the productivity of the image processing apparatus 100 from being impaired.

A second exemplary embodiment will be described below. In the first exemplary embodiment, even if a user presses the stop key in a state where the user is not currently logged in, the print job being executed is not stopped. The second exemplary embodiment differs from the first exemplary embodiment in that a function for suspending all jobs when pressing of the stop key (print suspension operation) is carried out in a state where there is no user who is currently logged in to the image processing apparatus 100 is added.

In the second exemplary embodiment, when the stop key is pressed in the state where the user is not currently logged in, all jobs including jobs being executed and print jobs remaining in the print queue are suspended. With this configuration, if there is a need to urgently stop a job, the job can be immediately stopped without the need for performing the login operation, thereby producing an advantageous effect that wasting of sheets can be prevented. In normal times with no urgency, on the other hand, a user can stop only his or her jobs by pressing the stop key after logging in to the image processing apparatus 100, so that no trouble is caused to other users.

Differences between the first exemplary embodiment and the second exemplary embodiment will be mainly described below.

Figure 17:
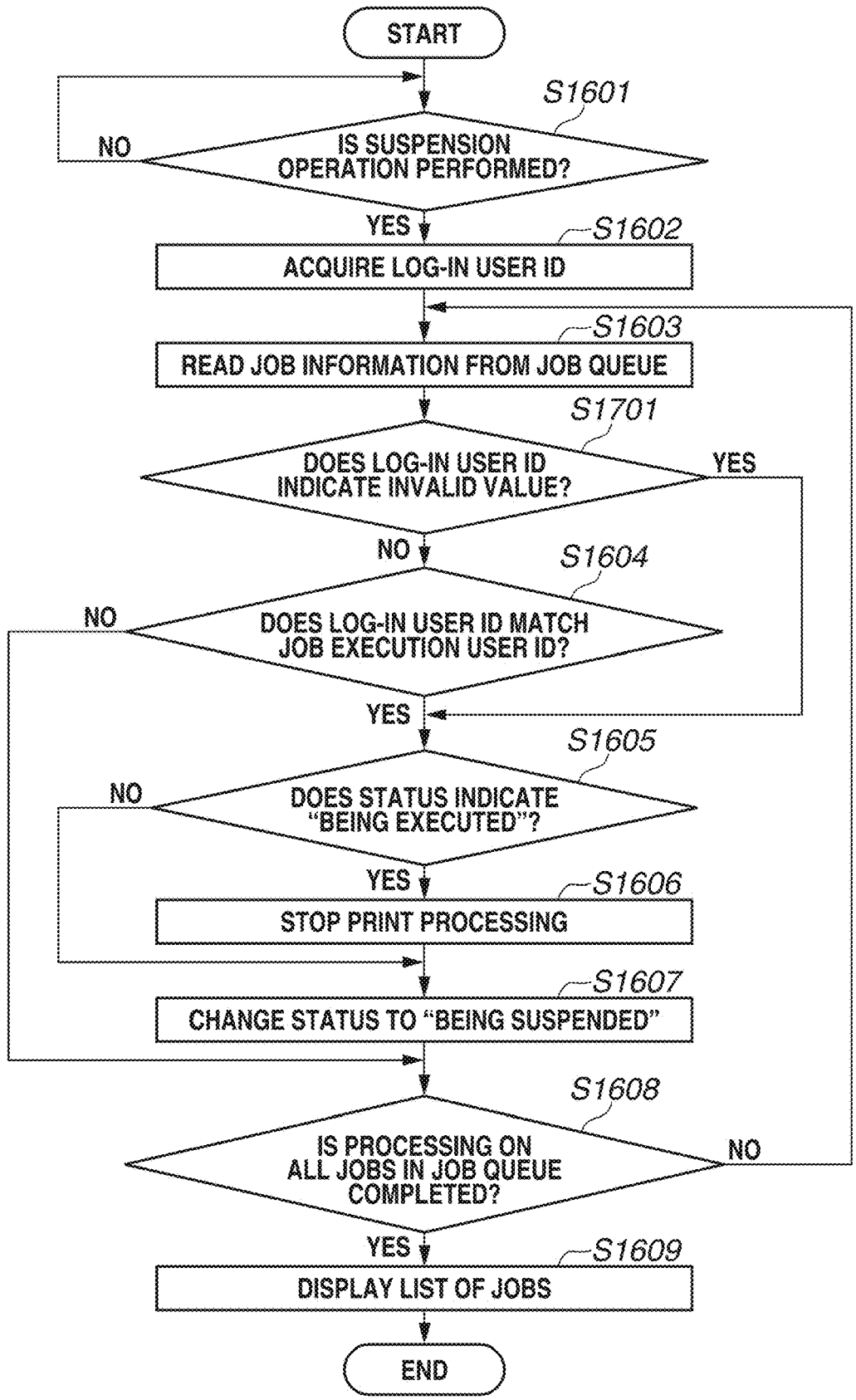
FIG. 17 is a flowchart illustrating job suspension processing performed by an image processing apparatus according to a second exemplary embodiment.

The print suspension processing to be performed by the image processing apparatus 100 according to the second exemplary embodiment will be described with reference to a flowchart illustrated in FIG. 17. The print suspension processing in the flowchart illustrated in FIG. 17 is implemented in such a manner that the CPU 111 executes processing for each function unit of the image processing apparatus 100.

The processing of steps S1601 to S1603 is identical to the processing of steps S1601 to S1603 illustrated in FIG. 16. Specifically, after the suspension operation is performed, processing for acquiring the logged-in user ID and reading job information from the job queue is performed. In step S1701, the CPU 111 determines whether the logged-in user ID acquired in step S1602 indicates an invalid value. In this case, the invalid value is a value indicating that there is no user who is currently logged in. The invalid value is stored in step S1507 when the user has logged out.

For example, when the login screen illustrated in FIG. 9 is displayed on the display 122, no one is logged in to the image processing apparatus 100. When the print suspension operation is performed in this state, the CPU 111 determines that the logged-in user ID indicates an invalid value (YES in step S1701). When the determination result in step 1701 indicates "YES", the determination processing in step S1604 is skipped, and the processing proceeds to step S1605. The processing of subsequent steps S1604 to S1609 are the same as the processing of steps S1604 to S1609 illustrated in FIG. 16. Specifically, when the determination result in step S1701 indicates "YES", the determination processing in step S1604 is skipped, so that all jobs are suspended regardless of whether the logged-in user ID matches the job execution user ID.

As described above, in the image processing apparatus 100 according to the second exemplary embodiment, when the user wishes to immediately stop a wasteful print output, the user presses the stop key in the state where there is no user who is currently logged in, so that jobs input by all users can be temporarily suspended.

On the other hand, when the user executes a job stopping operation after logging in to the image processing apparatus 100, only the job input by the user is suspended, and print processing is carried out without suspending jobs input by users other than the user, like in the first exemplary embodiment. Consequently, the productivity of the image processing apparatus 100 is not impaired.

A third exemplary embodiment will be described below. In the first exemplary embodiment, when the stop key is pressed by any user who is currently logged in, only the job executed by the user is stopped. The third exemplary embodiment differs from the first exemplary embodiment described above in that the job status can be switched by the authority of the user who is currently logged in to the image processing apparatus 100 so that jobs input by other users can be also suspended. Next, differences between the first exemplary embodiment and the third exemplary embodiment will be described.

In the third exemplary embodiment, in a case where a user who is currently logged in to the image processing apparatus 100 is a general user, only the job executed by the user is stopped. Meanwhile, in a case where the user who is currently logged in to the image processing apparatus 100 is an administrator user, all jobs, including jobs being executed and print jobs remaining in the print job queue, are suspended. With this configuration, general users do not inhibit the execution of jobs input by other users, whereas a user having an administrator authority can suspend all jobs, so that it is possible to obtain an advantageous effect that the user can urgently stop a job.

Figure 18:
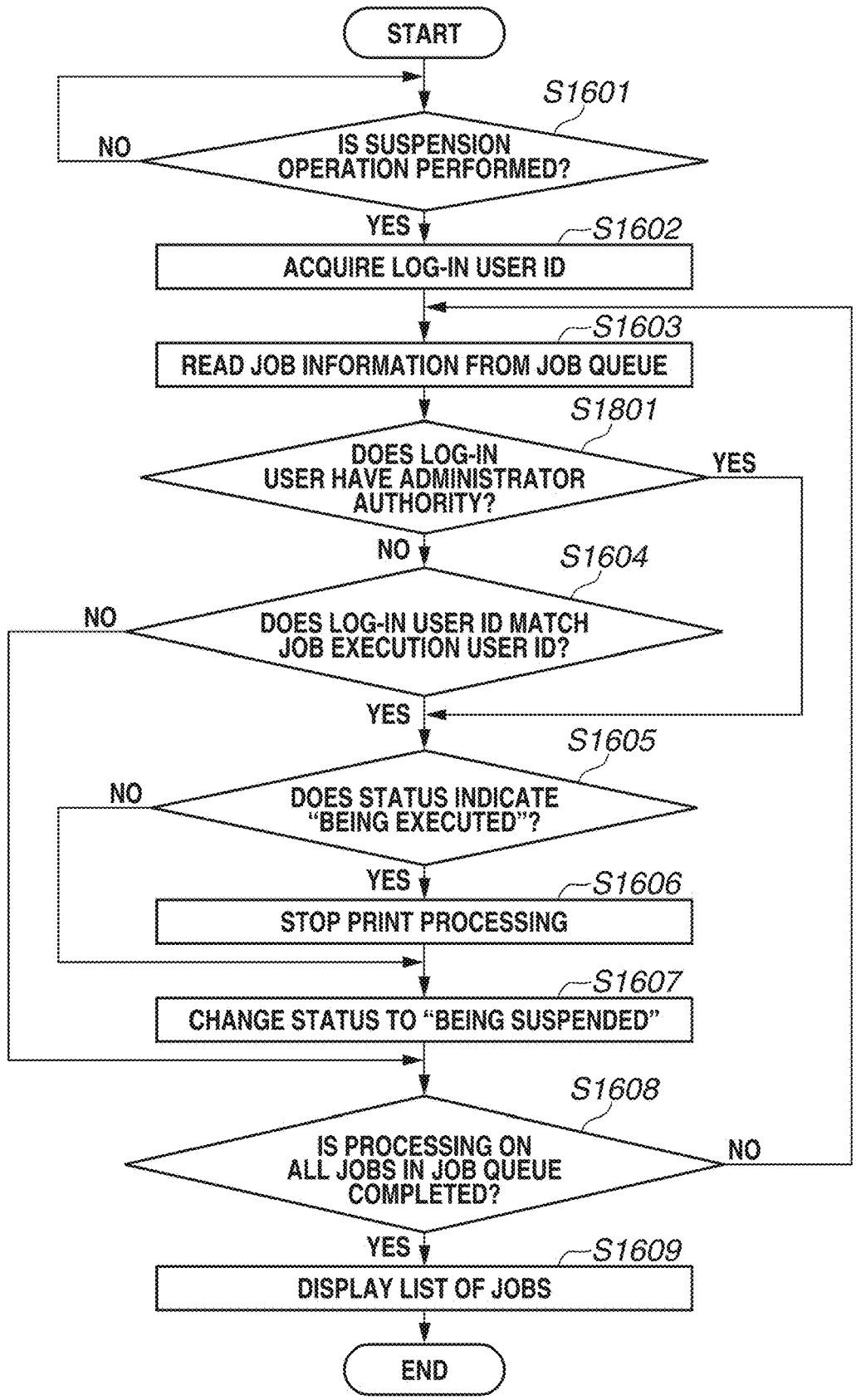
FIG. 18 is a flowchart illustrating job suspension processing performed by an image processing apparatus according to a third exemplary embodiment.

The print suspension processing to be performed by the image processing apparatus 100 according to the third exemplary embodiment will be described with reference to a flowchart illustrated in FIG. 18. The print suspension processing in the flowchart illustrated in FIG. 18 is implemented in such a manner that the CPU 111 executes processing for each function unit of the image processing apparatus 100.

The processing of steps S1601 to S1603 is identical to the processing of steps S1601 to S1603 illustrated in FIG. 16. In step S1801, the CPU 111 determines whether the logged-in user ID acquired in step S1602 corresponds to the user ID of an administrator user. To determine whether the logged-in user is a user having an administrator authority, information indicating whether the logged-in user has an administrator authority is obtained when it is checked whether the user is authenticated by the user authentication server PC(1) 201 in step S1503 illustrated in FIG. 15, and the obtained information is stored together with the logged-in user ID.

If it is determined that the logged-in user ID corresponds to the user ID of the user having an administrator authority (YES in step S1801), the determination processing in step S1604 is skipped, and the processing proceeds to step S1605. The processing of subsequent steps S1604 to S1609 is the same as the processing of steps S1604 to S1609 illustrated in FIG. 16. Specifically, when the determination result in step S1801 indicates "YES", i.e., when the logged-in user is an administrator user, the determination processing in step S1604 is skipped. All jobs thus can be suspended regardless of whether the logged-in user ID matches the job execution user ID.

As described above, in the image processing apparatus 100 according to the third exemplary embodiment, when a user having an administrator authority presses the stop key in the state where the user is currently logged in, jobs input by all users can be suspended. On the other hand, when a user having no administrator authority presses the stop key, only the job input by the user is suspended, so that the execution of jobs input by users other than the user is not inhibited, and the productivity of the image processing apparatus 100 is not impaired.

The image processing apparatus 100 may be configured such that the user can preliminarily set which one of the operations according to the first to third exemplary embodiments to be carried out when the user performs the job suspension operation. Alternatively, the processing may be changed depending on the number of times of executed suspension operation. For example, the image processing apparatus 100 may be configured such that, when the stop key is pressed for the first time, only the job input by the user who is currently logged in is suspended, and when the stop key is pressed again, all jobs, including jobs to be performed by users other than the user, are suspended.

While in the exemplary embodiments described above, the operation environment management unit 502 stores the operation environment information for each user, the operation environment management unit 502 may store the operation environment information about the image processing apparatus 100.

Further, in the exemplary embodiments described above, the user information management unit 501 and the operation environment management unit 502 are included in an external server such as the user authentication server PC (1). However, at least one of the user information management unit 501 and the operation environment management unit 502 may be included in the image processing apparatus 100.

The above-described exemplary embodiments have been described using a case where a print job received from an external information processing apparatus, such as a PC, is stopped. However, processing similar to the processing described above may also be executed with respect to a copy function for scanning a document by the scanner 125 and forming an image by the printer 124. For example, when the user logs in to the image processing apparatus 100 and presses the stop key, the image processing apparatus 100 suspends the print job and the copy job executed by the logged-in user. In this case, the image processing apparatus 100 executes print jobs and copy jobs, which are instructed to be executed by users other than the logged-in user, without suspending the jobs. This configuration prevents, when the stop key is pressed, the print jobs and copy jobs input by the users other than the logged-in user from being suspended, and also prevents execution of the jobs input by users other than the logged-in user from being inhibited.

Also, processing similar to the processing described above may also be executed in a case where facsimile transmission or electronic mail (e-mail) transmission for transmitting image data obtained by scanning (reading) a document to an external apparatus is performed. However, in the case of facsimile transmission or e-mail transmission, when the job that has been already started to be executed is suspended, the job cannot be resumed in some cases when an instruction to release the suspension is made. Accordingly, when the stop key is pressed, the image processing apparatus 100 performs control such that the job already started to be executed is not suspended or brought into an execution start waiting status.

According to the above-described exemplary embodiments, in the case where a user cancels a job, cancellation of the job of the user who has instructed to stop the job can be easily performed without stopping jobs of other users. Consequently, it is possible to appropriately perform job cancellation processing without deteriorating the productivity of the entire image processing apparatus 100.

Other Embodiments

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that the claims are not limited to the disclosed exemplary embodiments. The scope of the following claims is to be accorded the broadest interpretation so as to encompass all such modifications and equivalent structures and functions.

This application claims priority to Japanese Patent Application No. 2018-014285, which was filed on Jan. 31, 2018 and which is hereby incorporated by reference herein in its entirety.

What is claimed is:

1. An image processing apparatus including an image forming unit configured to print an image on a sheet, the image processing apparatus comprising:
    at least one processor in communication with at least one memory having stored thereon instructions that, when executed by the at least one processor, cause the at least one processor and the at least one memory to cooperate to act as:
    a storage unit configured to store a job and a user who has input the job in association with each other;
    a display unit configured to display a job list screen including a cancel button and a release button, the cancel button being a button for canceling jobs stored in the storage unit and canceling a job selected from among the jobs, the release button being a button for release from a suspension;
    a cancellation unit configured to, in a case where a job is selected on the job list screen and where the cancel button is pressed, cancel the job selected on the job list screen;
    a suspension unit configured to suspend a job stored in association with a user who is currently logged in to the image processing apparatus and not to suspend a plurality of jobs stored in association with a plurality of users who are not currently logged in to the image processing apparatus in a case where the user who is currently logged in to the image processing apparatus instructs a suspension; and
    a determination unit configured to, in response to an instruction by the user who is currently logged in to the image processing apparatus for a suspension, determine whether the user who is currently logged in to the image processing apparatus has an administrator authority or not;
    wherein, based on determining by the determination unit that the user who is currently logged in to the image processing apparatus has an administrator authority, jobs of all users including other users who are not logged in are suspended,
    wherein, in a case where the release button is pressed, the suspension unit releases the suspended job of the user who is currently logged in to the image processing apparatus from a suspended state.

2. The image processing apparatus according to claim 1, wherein the suspension is instructed by pressing one of a stop key or a stop button displayed on an operation screen.

3. The image processing apparatus according to claim 1, wherein the display unit selectably highlights at least one of the jobs displayed on the job list screen.

4. The image processing apparatus according to claim 1, wherein the display unit displays, on the job list screen, only the job associated with the user identification information acquired by the acquisition unit.

5. The image processing apparatus according to claim 1, wherein the instructions, when executed by the at least one processor, further cause the at least one processor and the at least one memory to cooperate to act as:
    a first determination unit configured to determine whether there is a user who is currently logged in to the image processing apparatus,
    wherein in a case where the first determination unit determines that there is no user who is currently logged in to the image processing apparatus, the suspension unit performs control such that jobs associated with all users are not executed.

6. The image processing apparatus according to claim 5, wherein the first determination unit determines whether there is a user who is currently logged in to the image processing apparatus, based on whether the user identification information indicates an invalid value.

7. The image processing apparatus according to claim 1, wherein authority of the user who is currently logged in to the image processing apparatus is acquired based on authority information acquired from an authentication server when the user logs in to the image processing apparatus.

8. The image processing apparatus according to claim 1, further comprising a reception unit configured to receive image data from an external apparatus,
    wherein the job that is controlled not to be executed by the suspension unit is a print job for printing an image on a sheet based on the image data received by the reception unit.

9. The image processing apparatus according to claim 1, further comprising a reading unit configured to read a document and generate image data,
    wherein the job that is controlled not to be executed by the suspension unit is a copy job for printing an image on a sheet based on the image data obtained by reading the document by the reading unit.

10. The image processing apparatus according to claim 1, wherein the display unit is further configured to display an operation screen after completion of a login operation of the user who is currently logged in to the image processing apparatus, and
    wherein the suspension is instructed by pressing one of a stop key or a stop button displayed on the operation screen.

11. The image processing apparatus according to claim 1, wherein the display unit is configured to display the job list screen after the log in of the user who is currently logged in to the image processing apparatus, and
    wherein the suspension is instructed by pressing one of a stop key or a stop button displayed on an operation screen that is displayed after the job list screen is displayed.

12. A control method for an image processing apparatus including an image forming unit configured to form an image on a sheet, the control method comprising:
    storing a job in a storage unit in association with user identification information;

acquiring the user identification information about a user who is currently logged in to the image processing apparatus;

after acquiring the user identification information about the user who is currently logged in to the image processing apparatus, displaying a job list screen for displaying jobs that have not been executed, wherein the job list screen includes a cancel button and a release button, the cancel button being a button for canceling jobs stored in the storage unit and canceling a job selected from among the jobs, the release button being a button for release from a suspension;

after displaying the job list screen,
  in a case where a job is selected on the job list screen and where the cancel button is pressed, canceling the job selected on the job list screen, and
  receiving an instruction to suspend the job in the storage unit;

in response to receiving the instruction to suspend the job in the storage unit, determining if the job in the storage unit is associated with the user who is currently logged in to the image processing apparatus based on the user identification information about the user who is currently logged in to the image processing apparatus and on the user identification information associated with the job in the storage unit, and determining if the user who is currently logged in to the image processing apparatus has an administrator authority or not;

suspending the job in the storage unit in a case where the job in the storage unit is determined to be associated with the user who is currently logged in to the image processing apparatus;

suspending the job in the storage unit and jobs of all users, including other users who are not logged, in the storage unit in a case where the user who is currently logged in to the image processing apparatus is determined to have an administrator authority;

disregarding the instruction to suspend the job in the storage unit in a case where the job in the storage unit is determined not to be associated with the user who is currently logged in to the image processing apparatus and where the user who is currently logged in to the image processing apparatus is determined not to have an administrator authority; and in response to the release button on the job list screen being pressed, releasing the job in the storage unit from a suspended state.

* * * * *